United States Patent
Moore et al.

(10) Patent No.: US 11,407,340 B2
(45) Date of Patent: Aug. 9, 2022

(54) CONVERTIBLE GOLF CART ASSEMBLY

(71) Applicant: Nivel Parts & Manufacturing Co., LLC, Jacksonville, FL (US)

(72) Inventors: Brent Moore, Tallahassee, FL (US); John R. Jordan, Tallahassee, FL (US)

(73) Assignee: Nivel Parts & Manufacturing Co., LLC, Jacksonville, FL (US)

( * ) Notice: Subject to any disclaimer, the term of this patent is extended or adjusted under 35 U.S.C. 154(b) by 16 days.

(21) Appl. No.: 17/154,363

(22) Filed: Jan. 21, 2021

(65) Prior Publication Data

US 2021/0146811 A1    May 20, 2021

Related U.S. Application Data

(63) Continuation of application No. 15/335,654, filed on Oct. 27, 2016, now Pat. No. 10,919,420, which is a (Continued)

(51) Int. Cl.
| | |
|---|---|
| *B60N 2/38* | (2006.01) |
| *B60N 2/36* | (2006.01) |
| *B60N 2/02* | (2006.01) |
| *B60N 2/58* | (2006.01) |
| *B60N 2/70* | (2006.01) |
| *B60N 2/34* | (2006.01) |

(Continued)

(52) U.S. Cl.
CPC ............ *B60N 2/36* (2013.01); *B60N 2/0292* (2013.01); *B60N 2/24* (2013.01); *B60N 2/34* (2013.01); *B60N 2/38* (2013.01); *B60N 2/58* (2013.01); *B60N 2/70* (2013.01); *B60N 2/75* (2018.02); *A47C 17/165* (2013.01); *A47C 17/207* (2013.01); *A47C 17/23* (2013.01)

(58) Field of Classification Search
CPC .......... B60N 2/36; B60N 2/0292; B60N 2/24; B60N 2/34; B60N 2/38
See application file for complete search history.

(56) References Cited

U.S. PATENT DOCUMENTS

| | | |
|---|---|---|
| 3,304,891 A | 2/1967 | Rachman |
| 5,485,976 A | 1/1996 | Creed et al. |

(Continued)

FOREIGN PATENT DOCUMENTS

| | | |
|---|---|---|
| CN | 201420023951.6 | 1/2014 |
| CN | 203663388 | 6/2014 |
| WO | WO2011047592 A1 | 4/2011 |

OTHER PUBLICATIONS

Nivel Parts "Flip Flop Seat Kits," May 2010.

(Continued)

*Primary Examiner* — Syed A Islam
(74) *Attorney, Agent, or Firm* — Barnes & Thornburg LLP

(57) ABSTRACT

A convertible golf cart seat assembly is disclosed. The convertible golf cart seat assembly includes a main seat frame attached to the existing golf cart structure, a plastic stationary cargo board supported by the main seat frame, a plastic flip board rotatably hinged to the main seat frame, and a seat with a plastic backer board attached to the flip board. The hinge between the flip board and the main seat frame includes flip board flanges on the flip board and cargo board flanges on the stationary cargo board that abut each other and provide strength to the cargo bed created by the stationary cargo board and the flip board.

20 Claims, 17 Drawing Sheets

Related U.S. Application Data continuation of application No. 14/451,735, filed on Dec. 23, 2014, now Pat. No. 9,481,265.

(60) Provisional application No. 61/925,905, filed on Jan. 10, 2014.

(51) Int. Cl.
  *B60N 2/24* (2006.01)
  *B60N 2/75* (2018.01)
  *A47C 17/207* (2006.01)
  *A47C 17/23* (2006.01)
  *A47C 17/165* (2006.01)

(56) References Cited

U.S. PATENT DOCUMENTS

| | | | |
|---|---|---|---|
| 6,371,560 | B1 | 4/2002 | Fulford et al. |
| 7,096,799 | B2 | 8/2006 | Strong et al. |
| 7,240,948 | B1 | 7/2007 | Houston |
| 7,461,601 | B2 | 12/2008 | Jin et al. |
| 7,640,870 | B2 | 1/2010 | Strong et al. |
| D640,594 | S | 6/2011 | Zhang |
| D646,201 | S | 10/2011 | Zhang |
| D646,604 | S | 10/2011 | Zhang |
| 8,070,181 | B2 | 12/2011 | Forrest et al. |
| 8,887,645 | B1 | 11/2014 | Semmer |
| 9,155,948 | B2 | 10/2015 | Tian |
| 2005/0264048 | A1 | 12/2005 | Collins |
| 2012/0241999 | A1 | 9/2012 | Krner |

OTHER PUBLICATIONS

Declaration of E. Gillet Boyce, Jun. 12, 2017 in PGR No. PGR2017-00035.
Madjax: "The Supplier That Wants to Boost Your Profits," Retrieved from http://archive.golfcaradvisor.com/a/previous-issues/madjax-the-supplier-boost-profits.php (Link tested and workable on Sep. 19, 2017.).
Printout of web page of MadJax installation video—https://www.youtube.com/watch?v=1BiGp2XyJPO, accessed and printed on Mar. 13, 2017.
MadJax youtube installation video https://www.youtube.com/watch?v=1BiGp2XyJPO dated Jan. 16, 2013. (Link tested and workable on Sep. 19, 2017.).
"Strech Plastics, Inc. Installation Instructions: Seat Kit for Yamaha Drive YDR-6-28," Jan. 3, 2013.
"Service Parts Manual for Electric Golf Car Model EG2028K Series," Suzhou Eagle Electric Vehicle Manufacturing Co., Ltd., Undated.
Rebykon Golf Ab, Retrieved from http://web.archive.org/web/20131126130513/http:/rebykongolf.se/pages.asp?PageID=3952 (Link tested and workable on Sep. 19, 2017.).
Resources—Eagle Electric Vehicle Manufacturing Co., Ltd. Retrieved from http://www.egale-ev.com/index.php?route=information%20/download (Link tested and workable on Sep. 19, 2017).
Suzhou Eagle Electric Vehicle Manufacturing Co. Ltd. Product Catalogue, undated.
Declaration of Michael Hebert, Jun. 19, 2017 in PGR No. PGR2017-00035.
Deposition of Michael J. Hebert, Aug. 3, 2017 in PGR No. PGR2017-00035.
Nivel Parts, "Rear Seating," undated.
"Design Solutions Guide: BASF The Chemical Company", 2007.
Invoice dated May 7, 2012 from Red Hawk to Central Main Golf Carts shipping SEAT-621B.
Photographs of SEAT-621B.
Red Hawk "2009 Golf Car Accessories & Parts Catalog," Apr. 1, 2009.
Declaration of Patrick A. Doody, Jun. 23, 2017 in PGR No. PGR2017-00035.
Declaration of Timothy Peterson, Jul. 31, 2017 in PGR No. PGR2017-00043.
Title: Red Hawk Golf Car Accessories & Parts Catalog; pp. cover, 4-18; Pub. Date: 2012; Publisher: Red Hawk LLC.
Title: EZ-GO Gasoline Service Parts Manual; pp. cover, Q-1 & Q-2; Pub. Date: Sep./Dec. 2011; Publisher: EZ-GO Division of Textron, Inc.
Title: Nivel Parts & Accessories Catalog; pp. cover, 2, 4, 5, 7, 10, 12, 14 & back cover; Pub. Date: 2012; Publisher: Nivel Parts & Manufacturing Company, LLC.

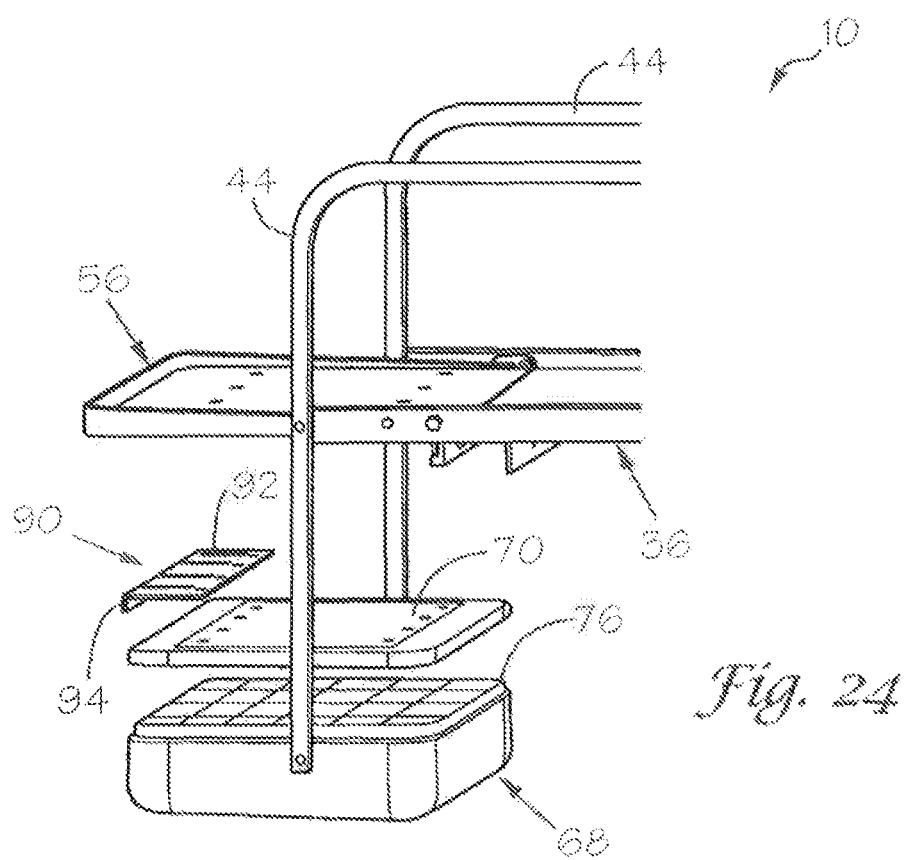

CONVERTIBLE GOLF CART ASSEMBLY

This application is a continuation application of co-pending U.S. patent application Ser. No. 15/335,654, which was filed on Oct. 27, 2016, which is a continuation application of U.S. patent application Ser. No. 14/451,735, which was filed on Dec. 23, 2014, which claims the benefit of priority to U.S. provisional patent application Ser. No. 61/925,905, which was filed on Jan. 10, 2014. The disclosures of each of the above-identified patent applications are incorporated herein by reference in their entirety.

FIELD OF THE INVENTION

This invention relates to a rear-facing golf cart seat assembly that converts to a cargo bed and more particularly relates to a golf cart seat and cargo bed that are strong and resistant to water damage.

BACKGROUND OF THE INVENTION

A conventional rear-facing golf cart seat has a plywood seat cushion backer board topped by a foam cushion and a vinyl cover. The vinyl cover is wrapped around the foam cushion and attached by staples to the plywood backer board. The cushion assembly is then screwed to a flip board with wood screws so that the seat can be flipped over to create a cargo bed. Over time, water intrusion causes the wood to rot regardless of the quality of the wood.

In order to address the rotting problem of a wood the seat backer board, a poly backer board has been substituted for the wooden seat cushion backer board. The poly backer board served as a portion of the cargo bed when the seat was flipped to the cargo position. The poly backer board, however, tended to warp over time creating an uneven cargo bed. Consequently, a conventional convertible rear-facing golf cart seat with a poly backer board generally required a steel frame around the outside of the poly backer board thereby creating undesirable weight.

Further, a poly backer board was usually attached to the golf cart frame by a piano hinge so that the seat could unfold into a cargo bed. This construction resulted in a cargo bed that had no rail around the edge so that cargo had to be tied down or the cargo would slip off the edges of the cargo bed. As a result of the deficiencies of the poly backer board without the railing, a steel or aluminum angle frame with a piece of plastic or sheet of metal creating the floor of the cargo bed was proposed. This configuration creates a rail for cargo but increases cost and results in a construction that is subject to corrosion and in most cases is subject to a problem created by water intrusion into the seat cushion.

Consequently, there is a need for a convertible golf cart seat that is not subject to rot, corrosion, or warping, is strong enough to bear weight on its rear portion, resists water intrusion into the foam seat cushion, and can retain cargo on the cargo bed without the necessity of tying down the cargo.

SUMMARY OF THE INVENTION

The present invention is a convertible golf cart seat assembly that attaches to the back of a golf cart or similar vehicle and that overcomes the problems identified above with respect to conventional convertible golf cart seat assembly with a wood backer board and other prior art convertible golf cart seat assemblies. The convertible seat assembly of the present invention includes a main seat frame attached to the existing golf cart structure, a plastic stationary cargo board supported by the main seat frame, a plastic flip board rotatably hinged to the main seat frame, and a seat attached to the flip board.

The main seat frame is generally rectangular and comprises two metal side rails each having an L-shaped cross-section, a metal front rail having an L-shaped cross-section, and a metal back rail having an L-shaped cross-section. The side rails extend rearwardly beyond the back rail. The side rails, the front rail, and the back rail, support a plastic stationary cargo board. The plastic stationary cargo board has a downwardly extending cargo board flange along the back edge of the stationary cargo board. The downwardly extending cargo board flange has a series of apertures along its length.

The flip board is molded plastic with an integral cargo rail molded around three sides of the flip board's periphery. When the flip board is in the cargo position and forms a portion of the cargo bed, the integral molded rail serves to restrain cargo from slipping off of the cargo bed. The flip board has hinge brackets that are rotatably attached to the side rails of the main seat frame by hinge bolts through matching holes in the hinge brackets and the side rails. The matching holes are generally aligned with the downwardly extending cargo board flange of the stationary cargo board. In order to provide a strong hinged connection between the flip board that forms a portion of the cargo bed and the stationary cargo board that forms a portion of the cargo bed, the flip board has a flip board flange extending at an angle to the plain of the flip board and along the front edge of the flip board. The flip board flange has a series of protrusions along its length. Consequently, when the flip board is in the cargo position, the flip board flange abuts the cargo board flange of the stationary cargo board, and the protrusions on the flip board flange engage the apertures on the cargo board flange.

The seat is attached to the flip board and comprises a foam seat cushion with a plastic seat cushion cap, a vinyl cover wrapped around the foam seat cushion and attached to the plastic seat cushion cap, and a plastic backer board in contact with the plastic seat cushion cap and the vinyl cover. The assembled seat, comprising the foam seat cushion with the plastic seat cushion cap, the vinyl cover, and the plastic backer board, is attached to the flip board by means of threaded metal inserts embedded in the plastic seat cushion cap and machine screws that pass through the flip board and through the plastic backer board and engage the threaded metal inserts that are embedded in the plastic seat cushion cap. Because the metal inserts are embedded in the plastic seat cushion cap, any water that wicks along the machine screws cannot reach the foam seat cushion and degrade the foam seat cushion.

The resulting construction of the convertible golf cart seat assembly with the abutting flip board flange and cargo board flange hinge creates a sturdy cargo bed when the flip board is in the cargo position. In addition, the molded flip board with its integral rail provides a cargo bed that keeps cargo from sliding off the sides or the back of the cargo bed. Further, the molded plastic flip board, backer board, and seat cushion cap not only create a laminated cargo bed that is strong but also create a seat that is impervious to moisture.

Further objects, features and advantages will become apparent upon consideration of the following detailed description of the invention when taken in conjunction with the drawings and the appended claims.

BRIEF DESCRIPTION OF THE DRAWINGS

FIG. 24 is an exploded bottom perspective view of the second embodiment a partial assembly of the convertible golf cart seat in accordance with the present invention.

DETAILED DESCRIPTION OF THE PREFERRED EMBODIMENT

Figure 21:
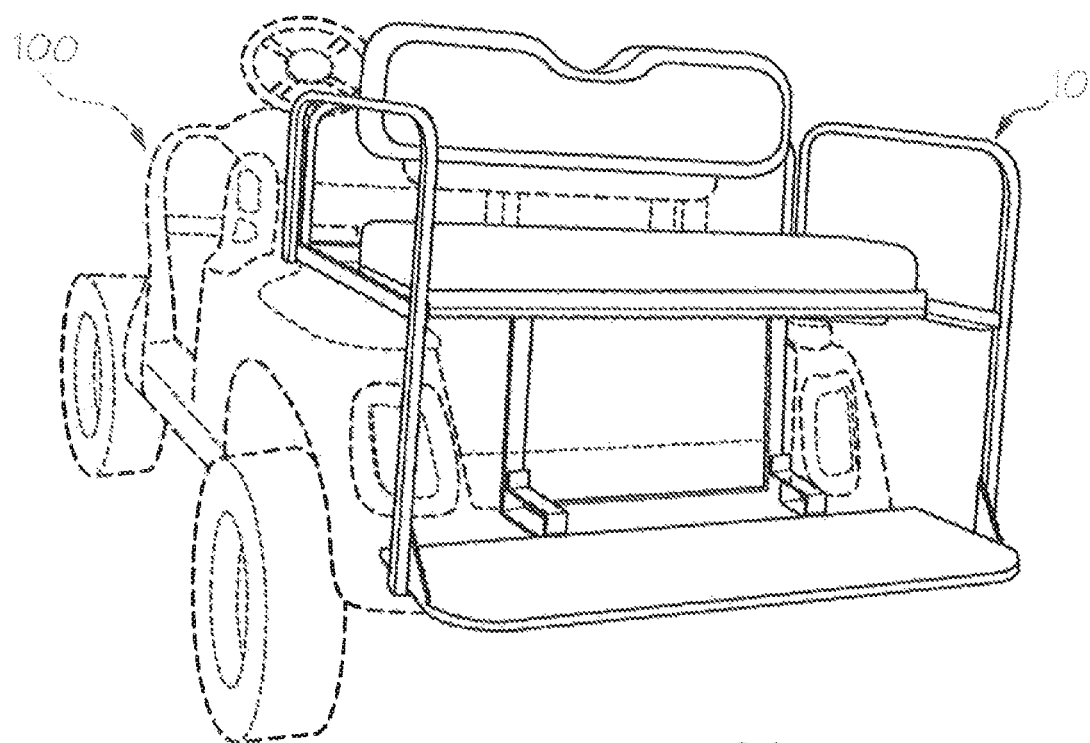
FIG. 21 is a back perspective view of a golf cart with the convertible golf cart seat in accordance with the present invention mounted thereon.

FIG. 21 shows a conventional golf cart 100 with a convertible golf cart seat assembly 10 mounted on the rear of the golf cart 100. The convertible golf cart seat assembly 10, as will be described in greater detail below, has a seating position shown in FIG. 21 and a cargo position, shown in FIG. 11.

Figure 9:
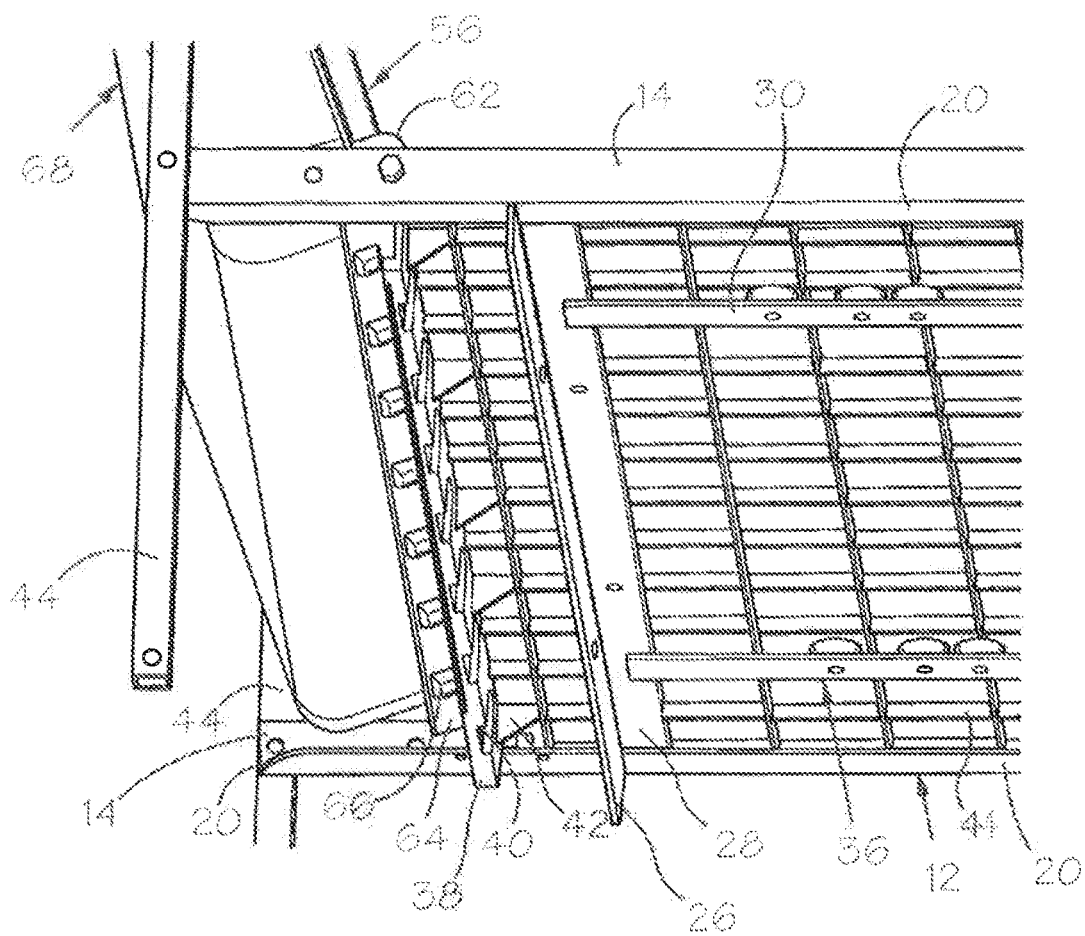
FIG. 9 is an enlarged partial bottom perspective view of the convertible golf cart seat in its intermediate position in accordance with the present invention.
Figure 10:
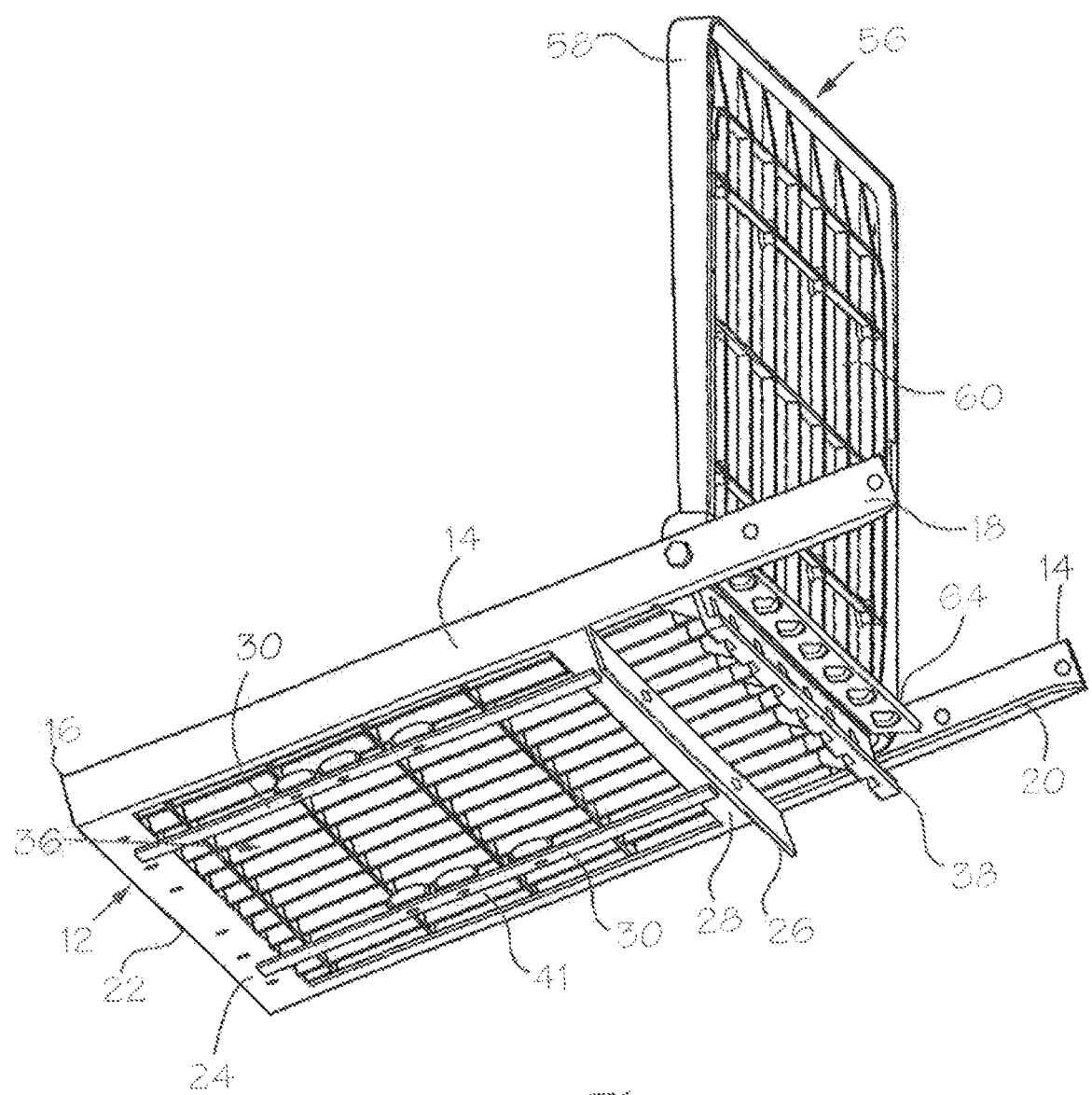
FIG. 10 is a bottom perspective view of a partial assembly of the convertible golf cart seat in its intermediate position including a main seat frame, a stationary cargo board, and a flip board, in accordance with the present invention.
Figure 11:
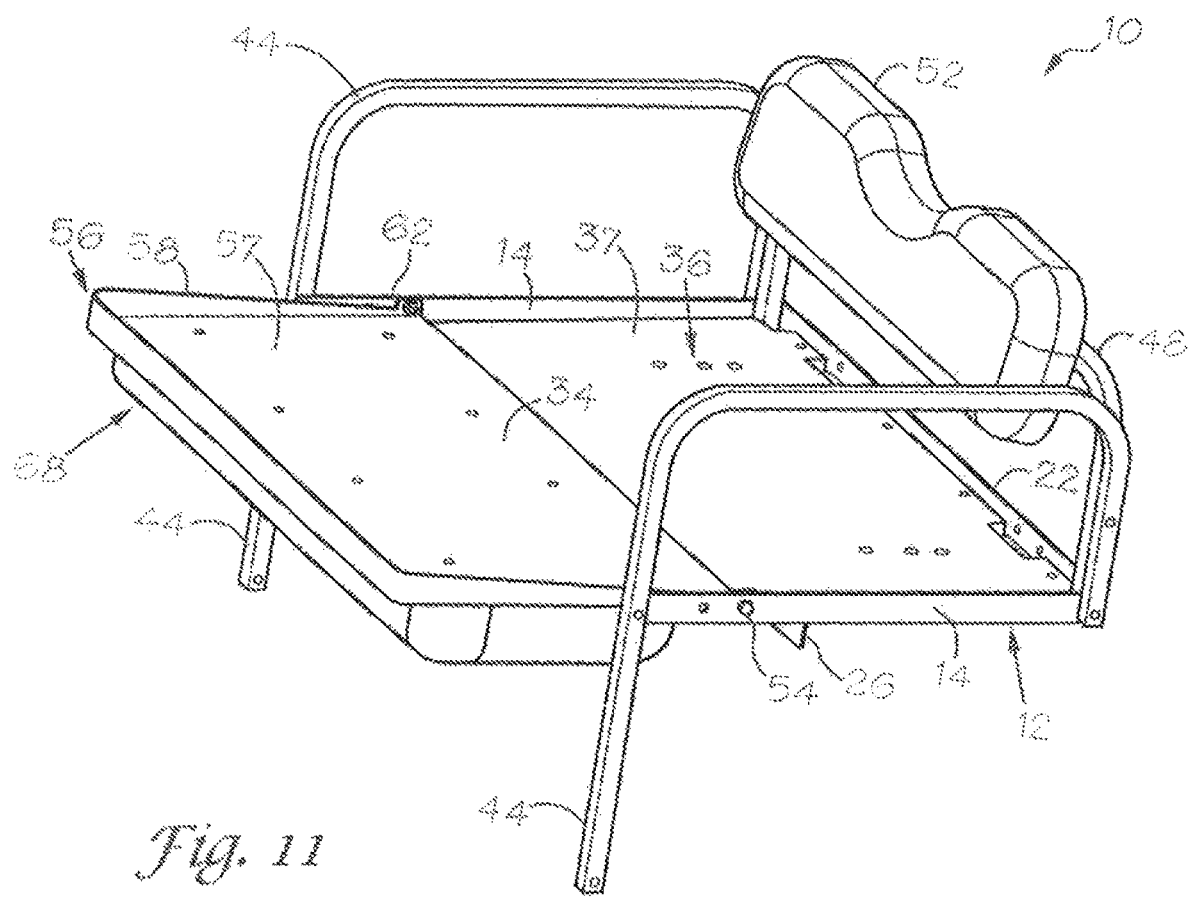
FIG. 11 a back perspective view of the convertible golf cart seat in its unfolded cargo position in accordance with the present invention.
Figure 12:
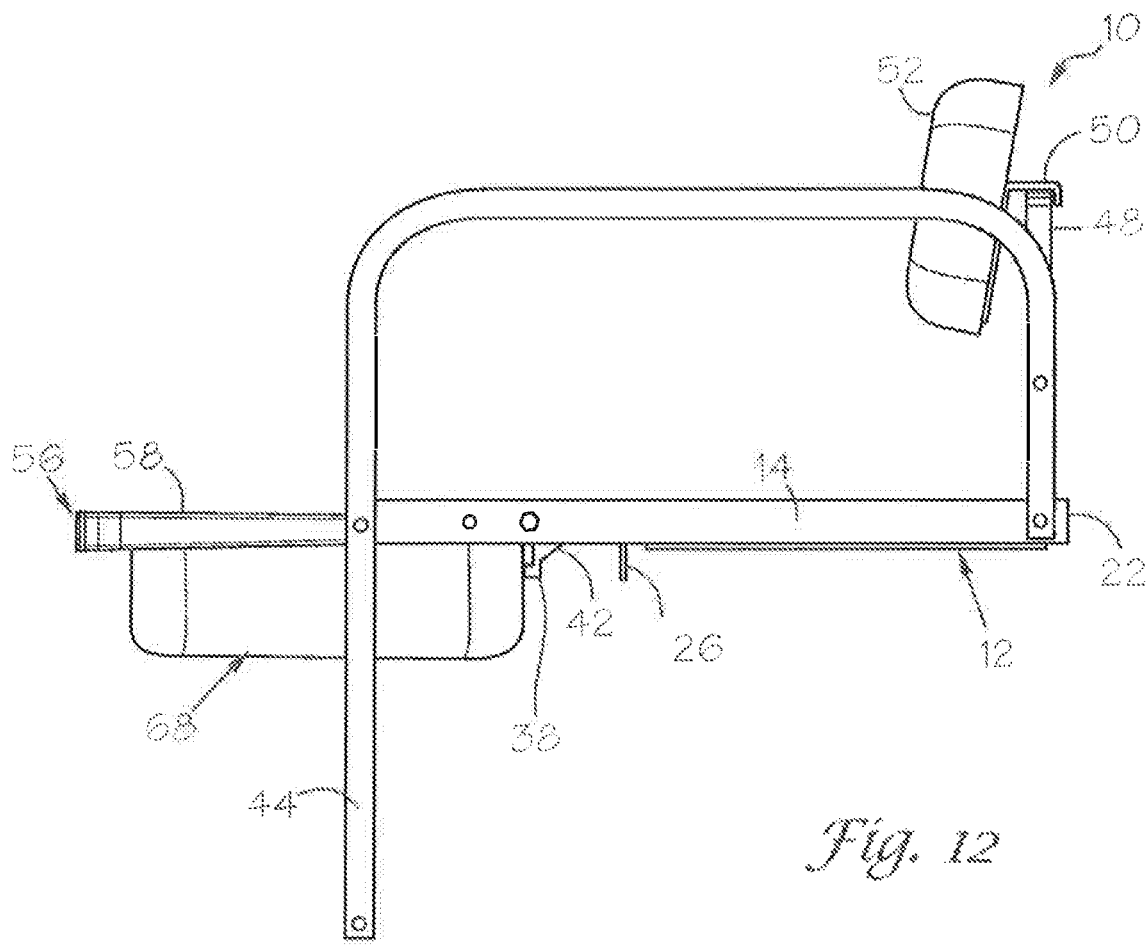
FIG. 12 is a side elevation view of the convertible golf cart seat in its unfolded cargo position in accordance with the present invention.

FIGS. 1-5 show in greater detail the convertible golf cart seat assembly 10 for the golf cart 100 in the seating position. FIGS. 11-18 show the convertible golf cart assembly 10 in the cargo position thereby forming a cargo bed 34 (FIG. 11). FIGS. 6-10, 19, and 20 show the convertible golf cart assembly 10 in an intermediate position between the seating position and the cargo position.

The convertible golf cart seat assembly 10 comprises a main seat frame 12, a stationary cargo board 36, a flip board 56, a seat 68, armrests 44, and a seat back 52. The armrests 44 are j-shaped with front upright members 45 and back upright members 46. The armrests 44 are formed of square tubular metal elements. The upright members 45 and 46 of the armrests 44 are connected to the frame of the golf cart 100. The main seat frame 12 is attached to the upright members 45 and 46 of the armrests 44 and is supported by the armrests 44 on the golf cart 100. The seat back 52 is connected to the armrests 44 by means of a u-shaped seatback support 48 attached to the front upright members 46. The seatback support 48 is formed of a square tubular metal element. The seatback support 48 has seatback brackets 50 (FIG. 5) that connect the seatback 52 to the seatback support 48.

Figure 1:
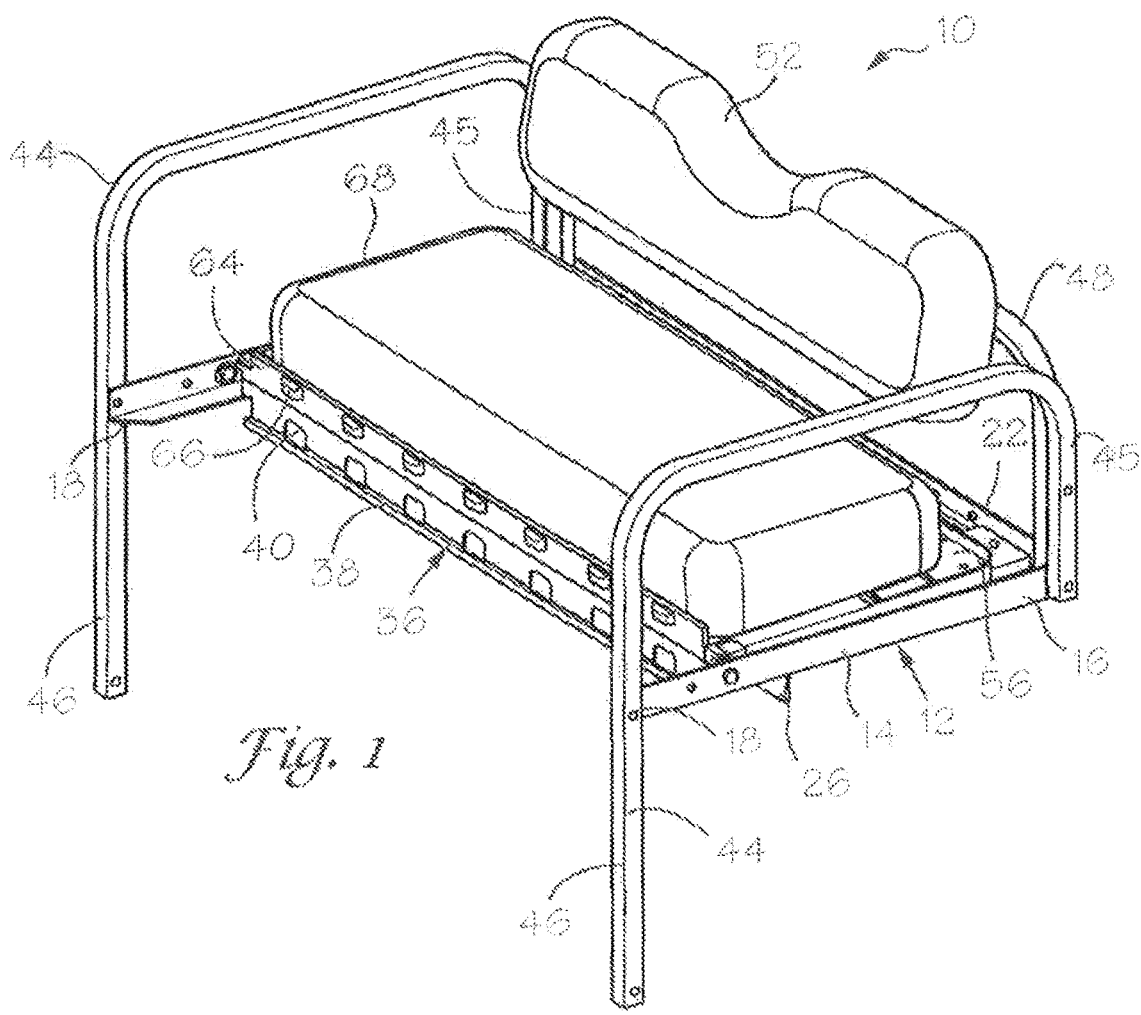
FIG. 1 is a back perspective view of a convertible golf cart seat in its seating position in accordance with the present invention.
Figure 2:
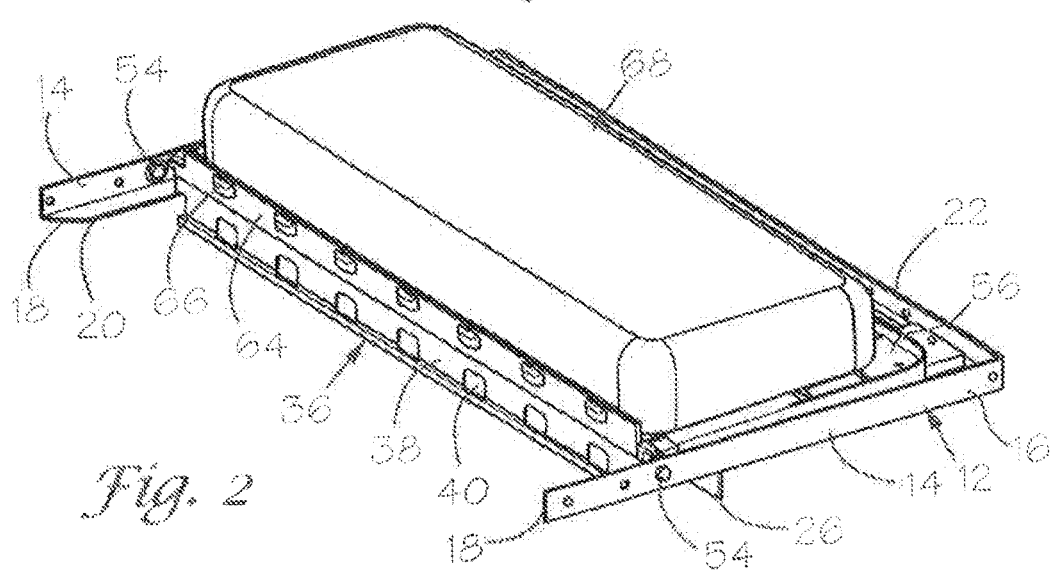
FIG. 2 is a back perspective view of a portion of the convertible golf cart seat in its seating position in accordance with the present invention.
Figure 3:
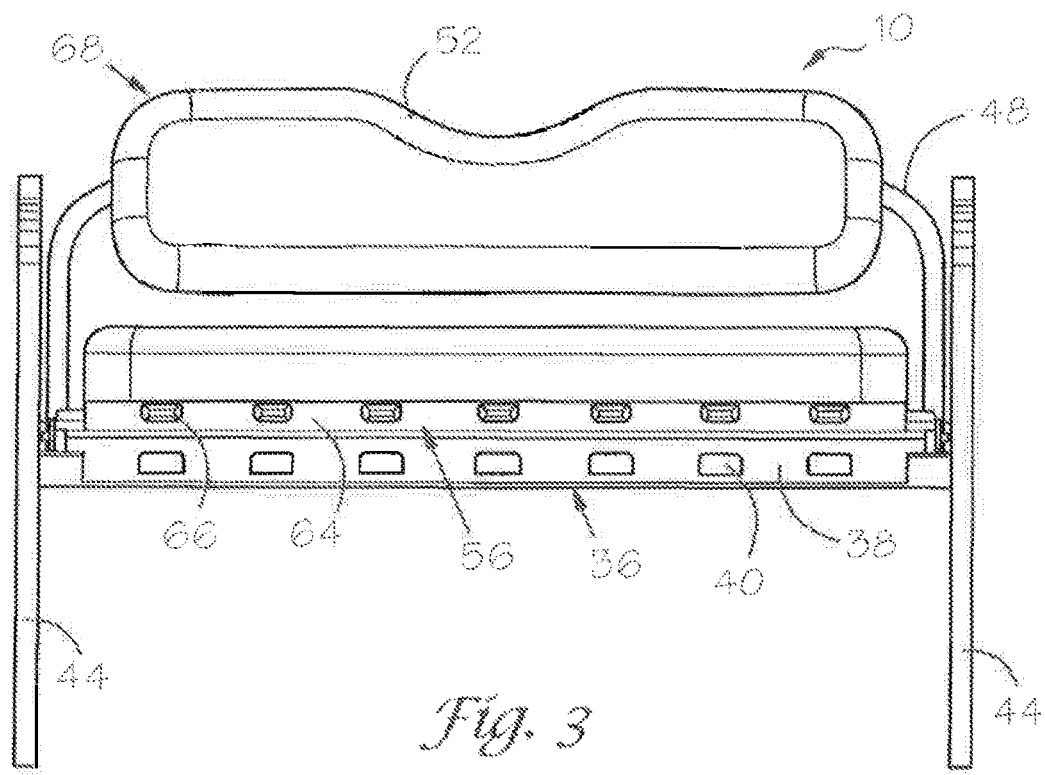
FIG. 3 is a back elevation view of the convertible golf cart seat in its seating position in accordance with the present invention.
Figure 4:
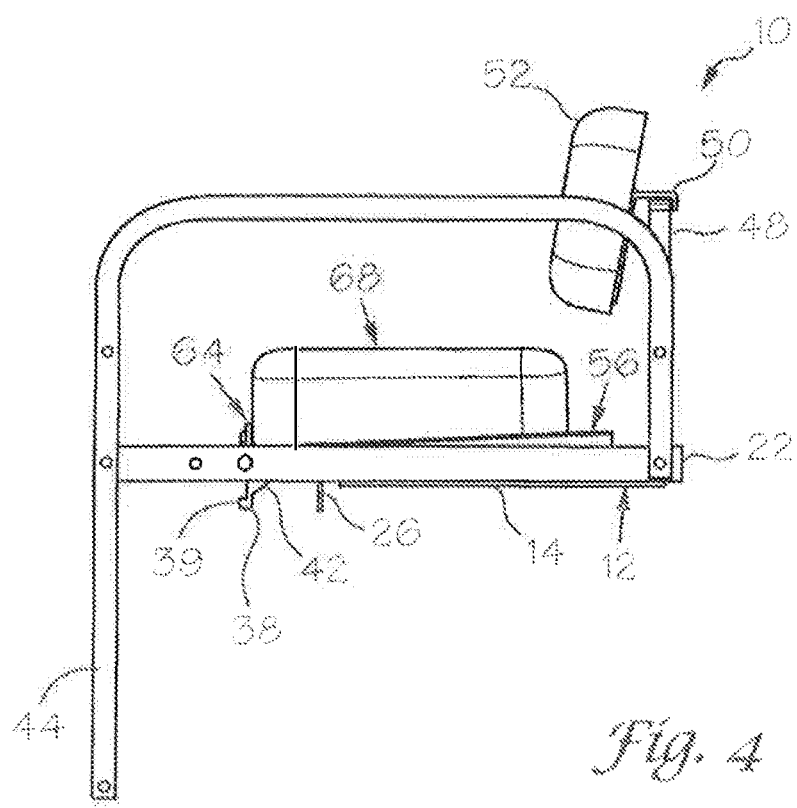
FIG. 4 is a side elevation view of the convertible golf cart seat in its seating position in accordance with the present invention.
Figure 5:
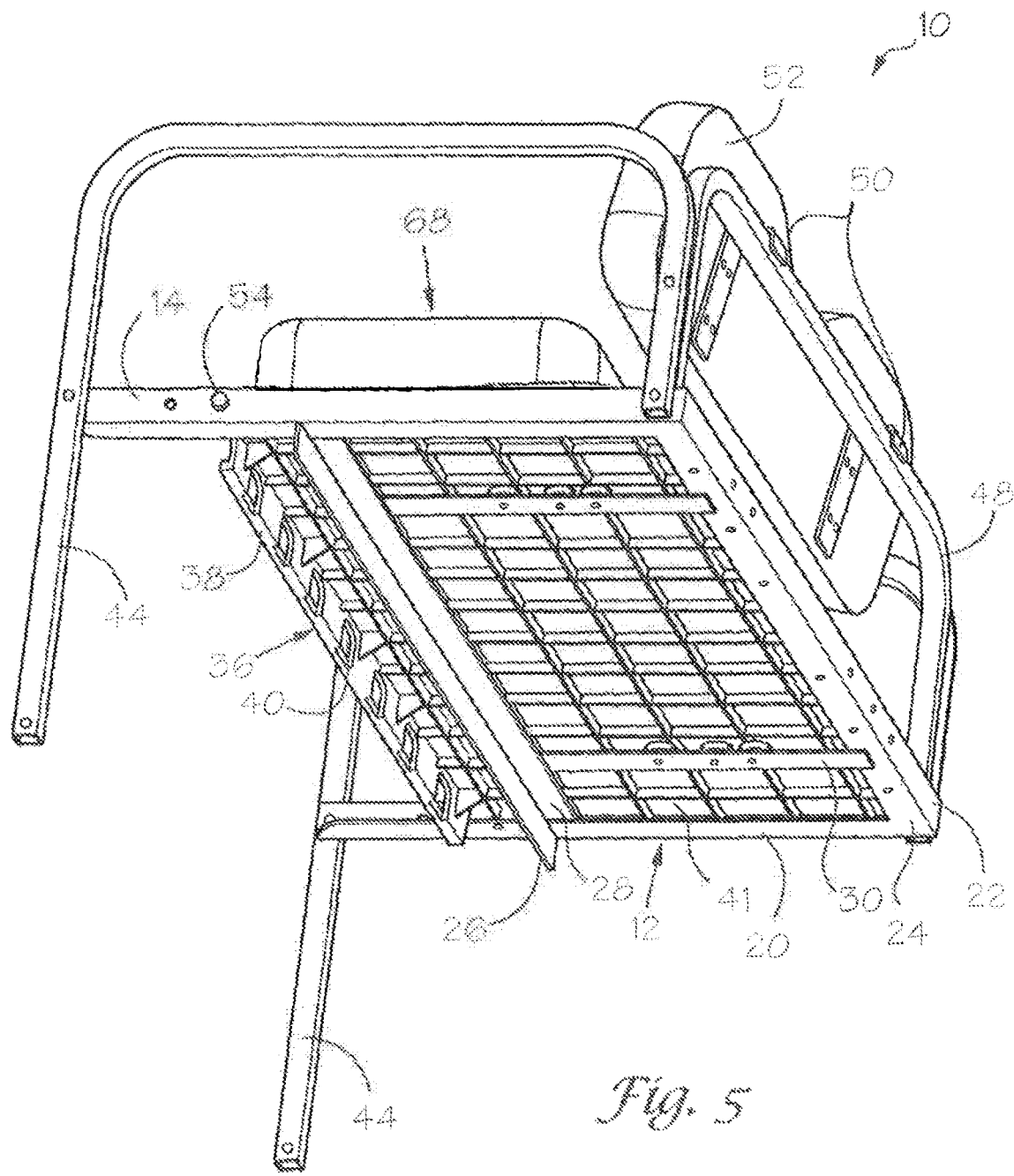
FIG. 5 is a bottom perspective view of the convertible golf cart seat in its seating position in accordance with the present invention.
Figure 6:
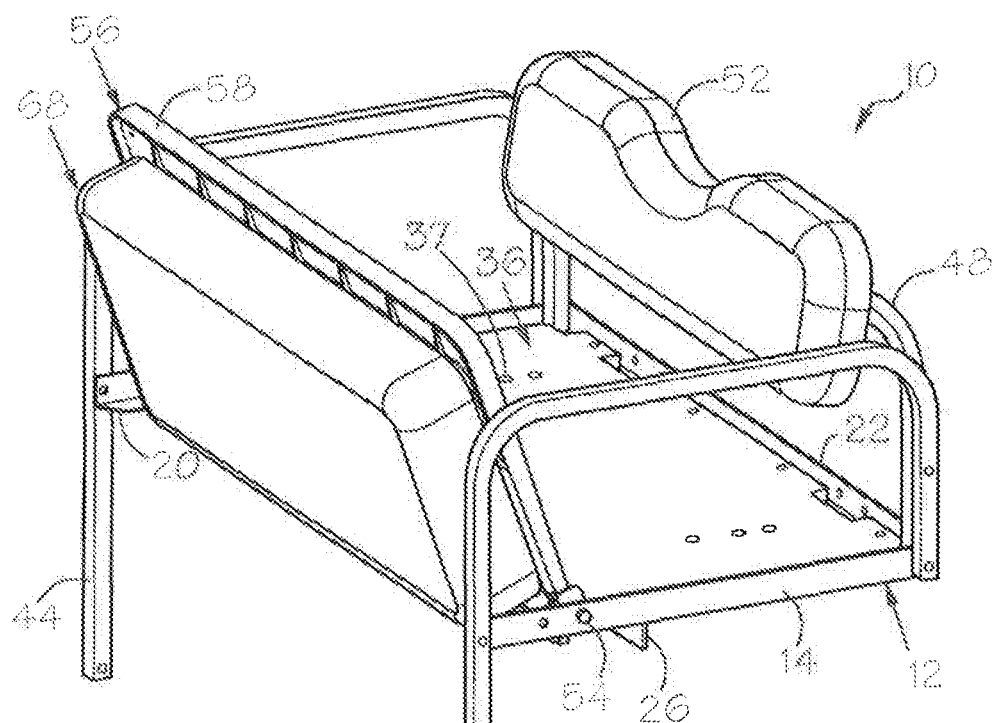
FIG. 6 a back perspective view of the convertible golf cart seat in its intermediate position in accordance with the present invention.
Figure 7:
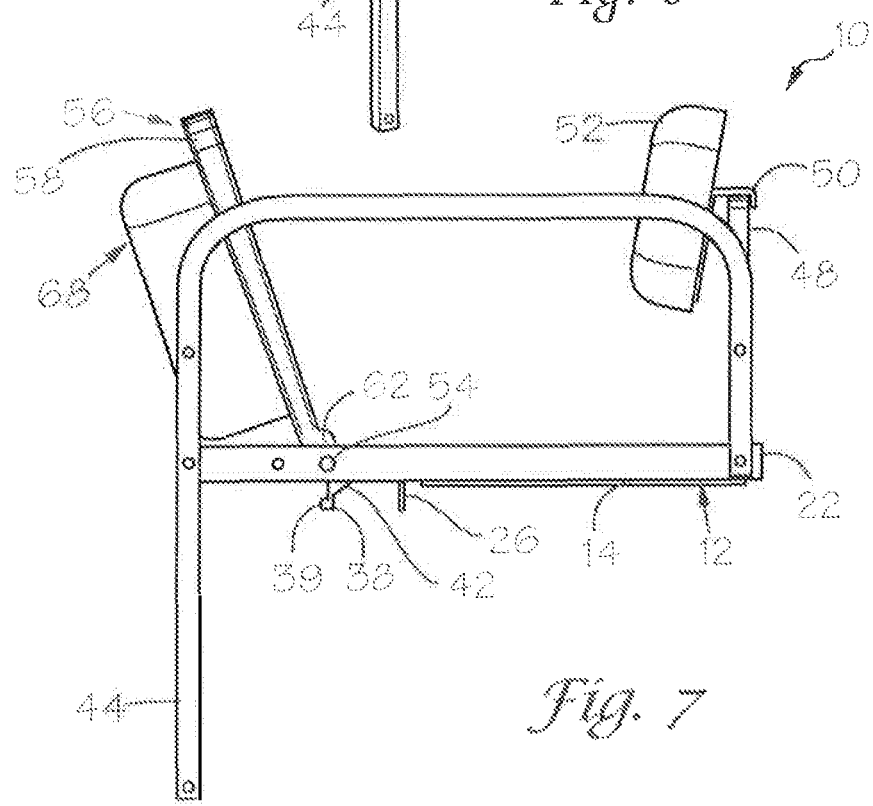
FIG. 7 is a side elevation view of the convertible golf cart seat in its intermediate position in accordance with the present invention.
Figure 8:
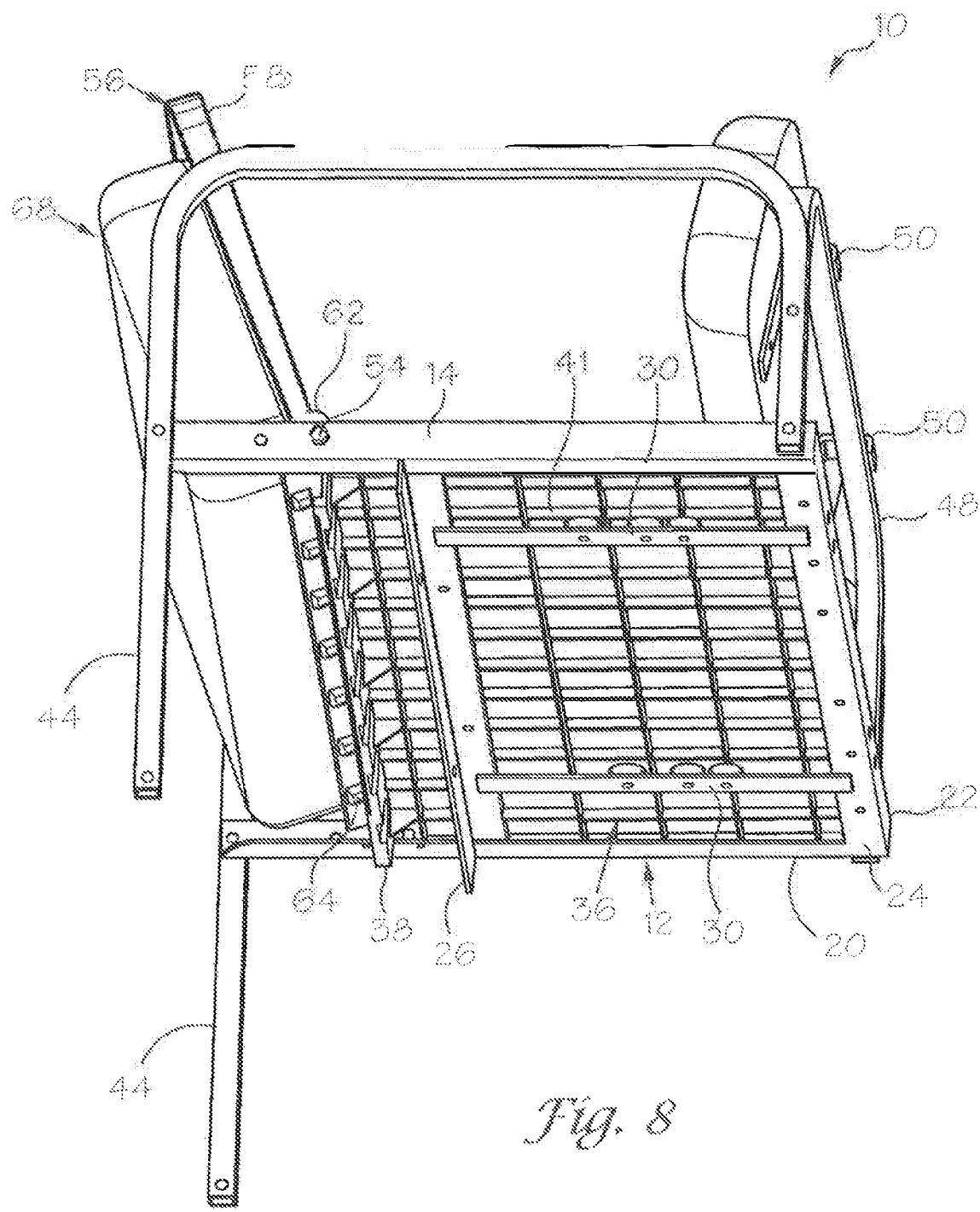
FIG. 8 is a bottom perspective view of the convertible golf cart seat in its intermediate position in accordance with the present invention.

The main seat frame 12 is best illustrated in FIGS. 10, 18, 19, and 20. Particularly, the main seat frame 12 comprises side rails 14 each with a front end 16 and a back end 18 (FIGS. 1 and 2). The side rails 14 are joined together by means of a front rail 22 and a back rail 26. The side rails 14, the front rail 22, and the back rail 26 all have an L-shaped cross-section. As a result of the L-shaped cross-section, the side rails 14 have side rail flanges 20, the front rail has a front rail flange 24, and the back rail has a back rail surface 28. The side rail flanges 20, the front rail flange 24, and the back rail surface 28 are all coplanar and support the stationary cargo board 36. Intermediate lateral supports 30 are also connected to the front rail 22 and the back rail 26 to provide additional support for the stationary cargo board 36. The side rails 14 also have hinge holes 53 position adjacent the back ends 18 of the side rails 14. The hinge holes 53 align with bracket holes 55 in hinge brackets 62 of the flip board 56, and hinge bolts 54 rotatably secure the flip board 56 to the side rails 14 of the main seat frame 12.

The stationary cargo board 36 is a single piece of molded plastic. The stationary cargo board 36 includes a flat stationary cargo portion 37 (FIG. 11) with a downwardly extending cargo board flange 38 on the back edge of the stationary cargo board 36. The downwardly extending cargo board flange 38 is set at cargo board angle to the plane of the flat stationary cargo portion 37. The cargo board angle is approximately 90 degrees. The downwardly extending cargo board flange 38 has a series of cargo board flange apertures 40 (FIGS. 1, 2, 3, 9, and 20). The stationary cargo board 36 is dimensioned and positioned on the main seat frame 12 so that the cargo board flange 38 on the back edge of the stationary cargo board 36 is positioned forward of the back ends 18 of the side rails 14 as shown in FIGS. 1 and 2. As best seen in FIG. 9, the stationary cargo board 36 has reinforcing ribs 41 on the bottom that reinforce the flat cargo portion 37 and reinforcing gussets 42 that reinforce the downwardly extending cargo board flange 38. The material for the stationary cargo board 36 is preferably 10% calcium carbonate filled polypropylene.

Figure 18:
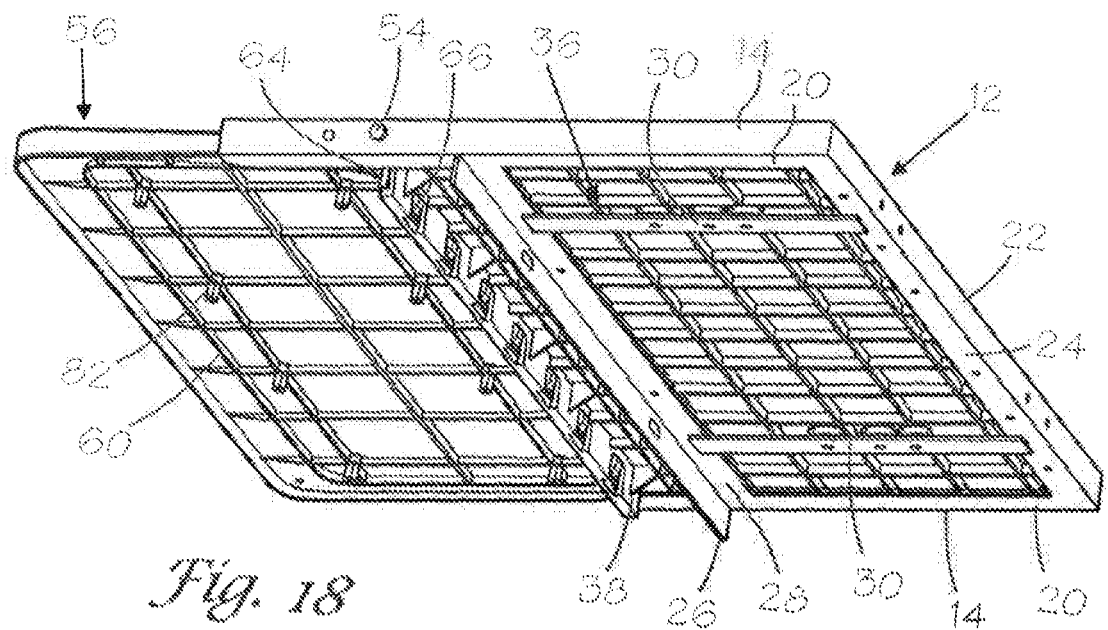
FIG. 18 is a bottom perspective view of a partial assembly of the convertible golf cart seat in its unfolded cargo position including the main seat frame, the stationary cargo board, and the flip board, in accordance with the present invention.
Figure 20:
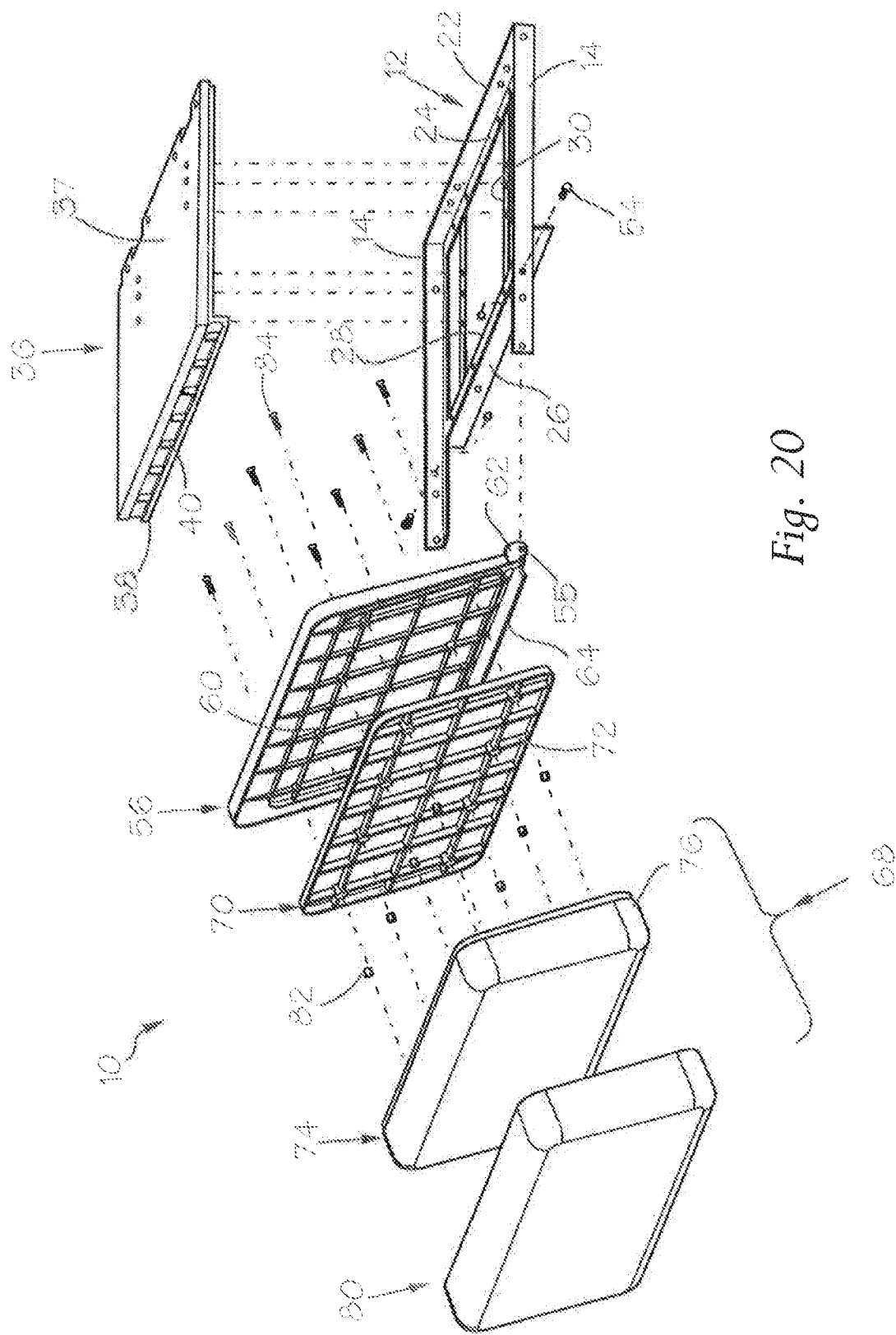
FIG. 20 is an exploded perspective view of a partial assembly of the convertible golf cart seat in accordance with the present invention.

The flip board 56 is a single piece of molded plastic. The flip board 56 has a flat flip board cargo portion 57 (FIG. 11), cargo rails 58, hinge brackets 62, a flip board flange 64, and reinforcing ribs 60 (FIGS. 10, 18, and 20). The flip board flange 64 depends from the front edge of the flip board cargo portion 57 and is set at a flip board angle to the plane of the flip board cargo portion 57. The flip board angle is approximately 90 degrees. Because the flip board 56 is a single piece of molded plastic, the cargo rails 58 are integral with the flat flip board cargo portion 57. The cargo rails 58 extend along the back edge and side edges of the flip board 56. The front edge of the flip board 56 adjacent the hinge brackets 62 and the flip board flange 64 does not have a cargo rail. Reinforcing ribs 60 on the bottom of the flip board 56 reinforce the flat flip board cargo portion 57 (FIGS. 10, 18, and 20). As previously described, the hinge brackets 62 rotatably connect the flip board 56 to the main seat frame 12 by means of aligned holes 55 in the hinge brackets 62, holes 53 in the side rails 14, and hinge bolts 54.

Figure 13:
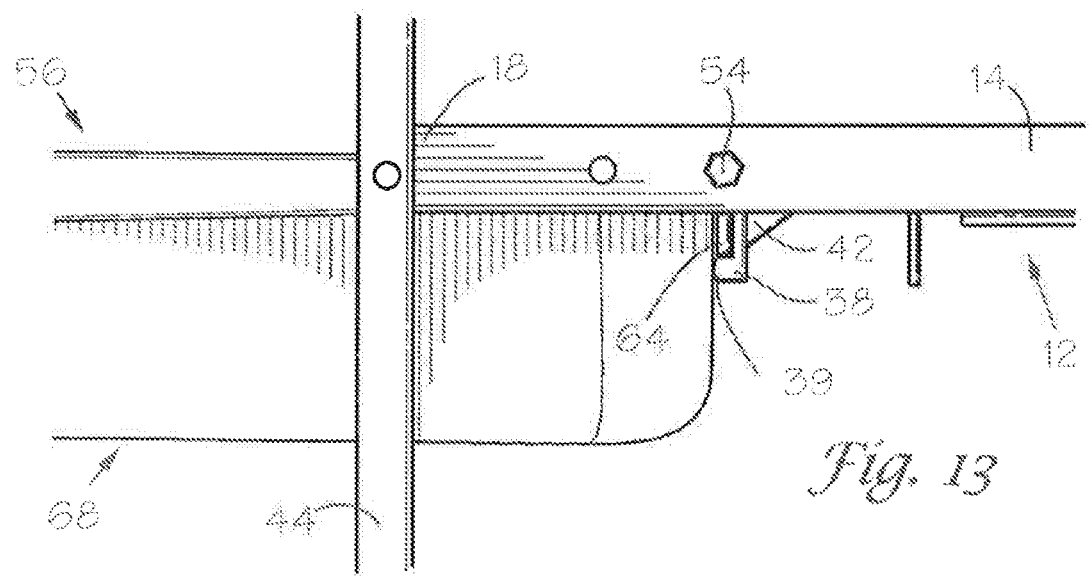
FIG. 13 is an enlarged partial side elevation view of the convertible golf cart seat in its unfolded cargo position in accordance with the present invention.
Figure 14:
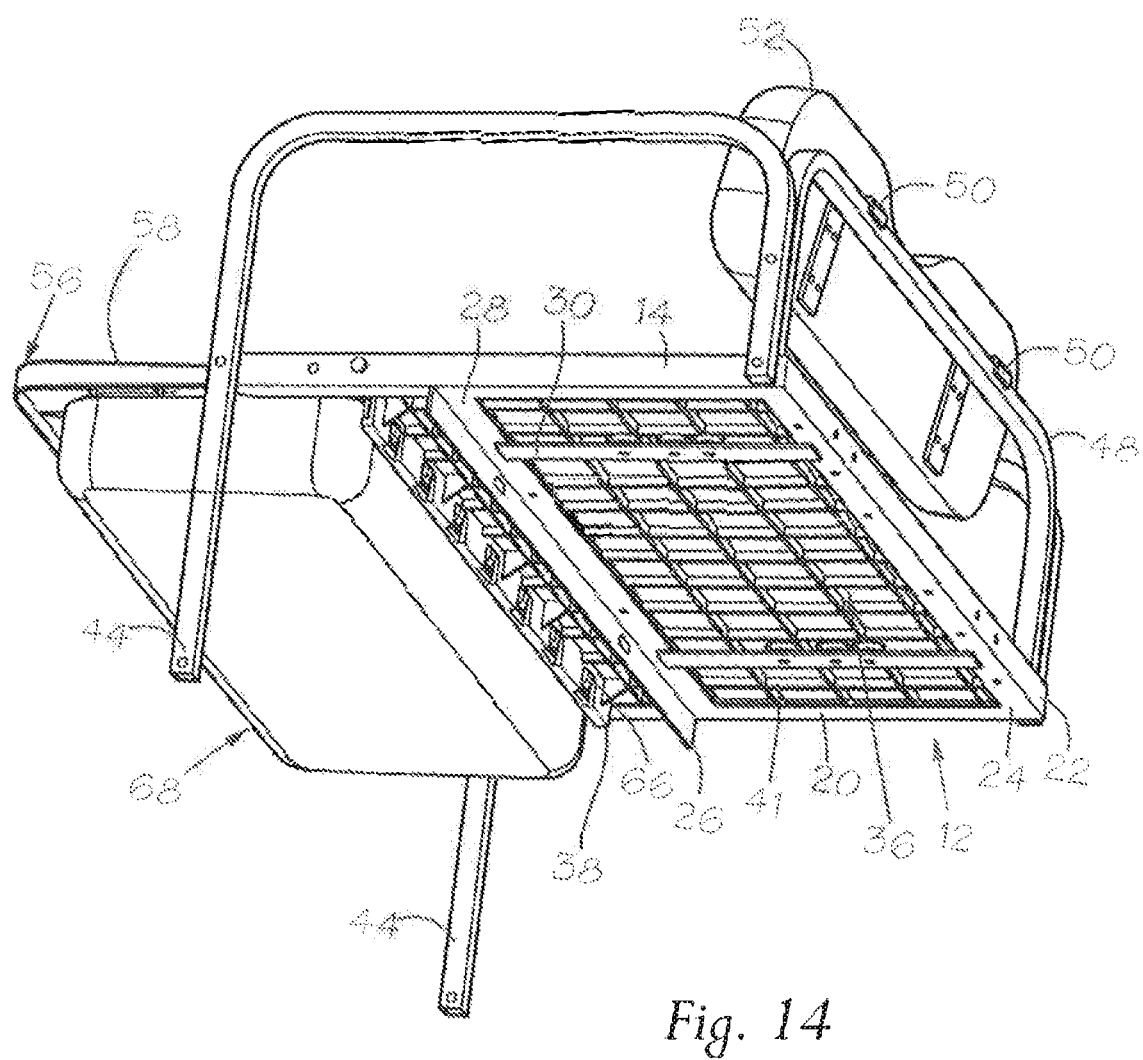
FIG. 14 is a bottom perspective view of the convertible golf cart seat in its unfolded cargo position in accordance with the present invention.
Figure 15:
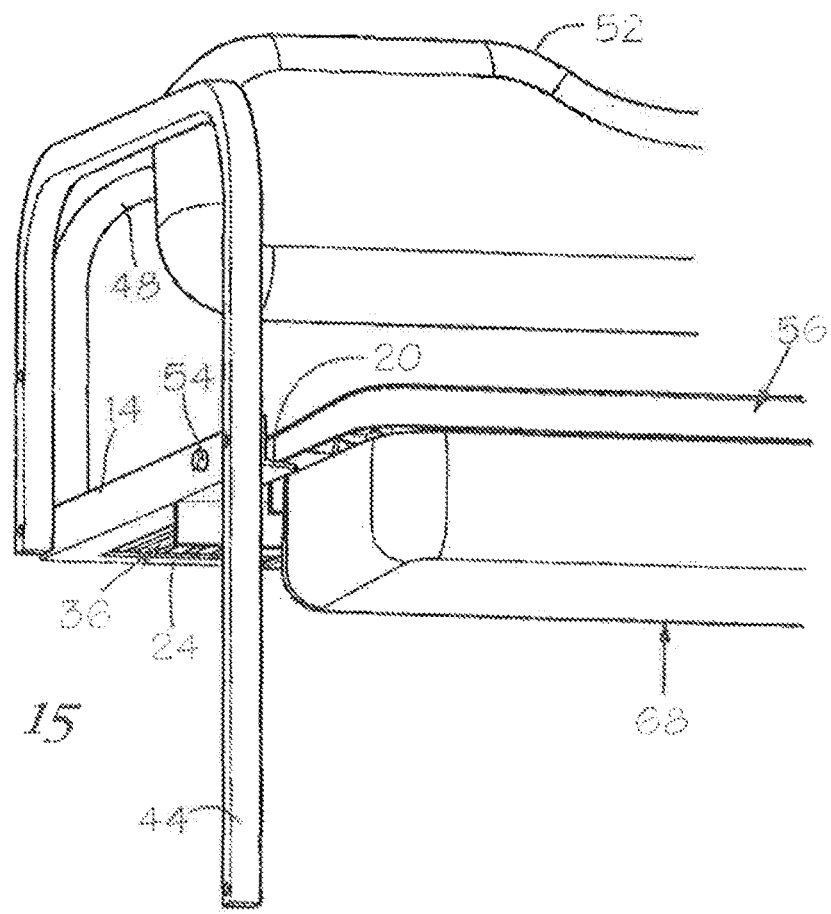
FIG. 15 is an enlarged partial bottom perspective view of the convertible golf cart seat in its unfolded cargo position in accordance with the present invention.
Figure 16:
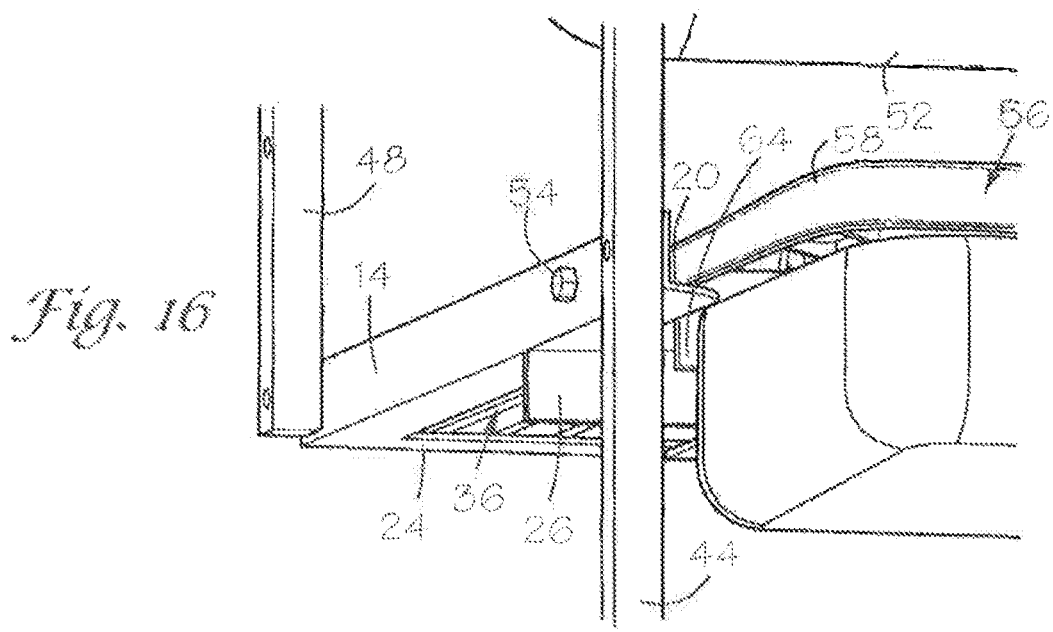
FIG. 16 is an enlarged partial bottom perspective view of the convertible golf cart seat in its unfolded cargo position in accordance with the present invention.
Figure 17:
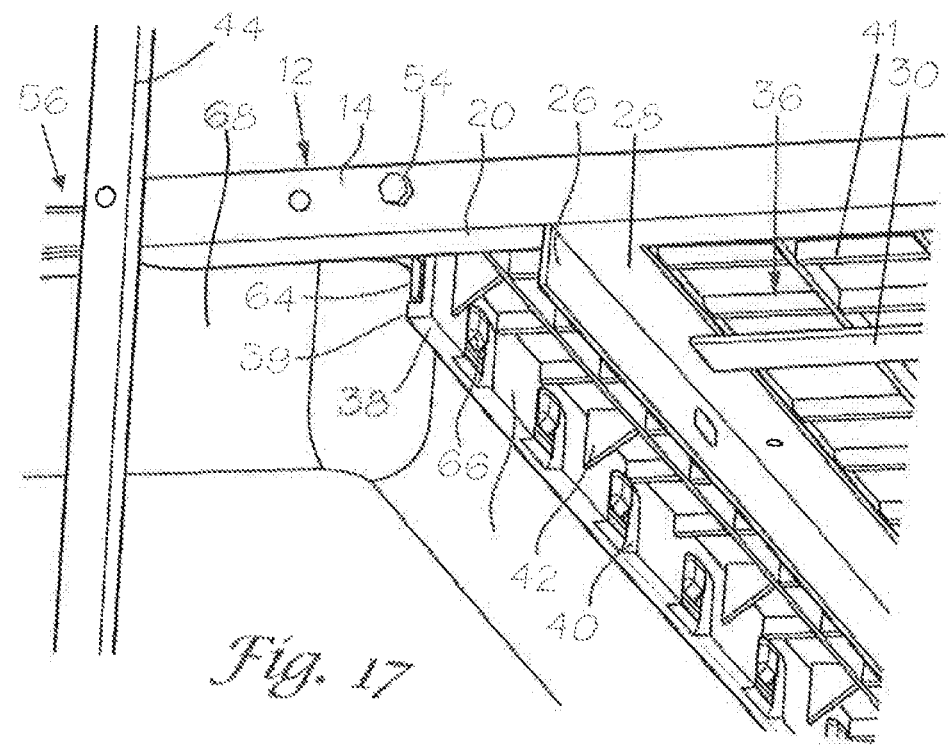
FIG. 17 is an enlarged partial bottom perspective view of the convertible golf cart seat in its unfolded cargo position in accordance with the present invention.

A feature of the present invention is the cooperation of the flip board flange 64 with the cargo board flange 38 when the flip board 56 is in the cargo position as shown in FIGS. 11-18. FIG. 13 illustrates the flip board flange 64 in abutment with the cargo board flange 38 of the stationary cargo board 36. Particularly, the cargo board flange 38 also has a lip 39 that engages the lower edge of the flip board flange 64. FIG. 17 further illustrates the engagement between the flip board flange 64 and the cargo board flange 38 of the stationary cargo board 36. Particularly, the flip board flange 64 has protrusions 66 spaced along the length of the flip board flange 64. Likewise, the cargo board flange 38 has matching cargo board flange apertures 40. The protrusions 66 extend into the apertures 40 and thereby stabilize the abutment between the flip board flange 64 and the cargo board flange 38. The protrusions 66 and the apertures 40 could be reversed with protrusions 60 on the cargo board flange 38 and the apertures 40 on the flip board flange 64. The combination of the abutting flip board flange 64 and the cargo board flange 38 provides a reinforcing member extending across the width of the cargo bed 34.

In addition to the abutment of the flip board flange 64 and the cargo board flange 38, the flip board 56 is supported in the cargo position by the side rail flanges 20 of the side rails 14. The sides of the flip board 56 are engaged by the side rail flanges 20 from a position adjacent the hinge bolts 54 to the ends 18 of the side rails 14 (FIGS. 15 and 16).

Figure 19:
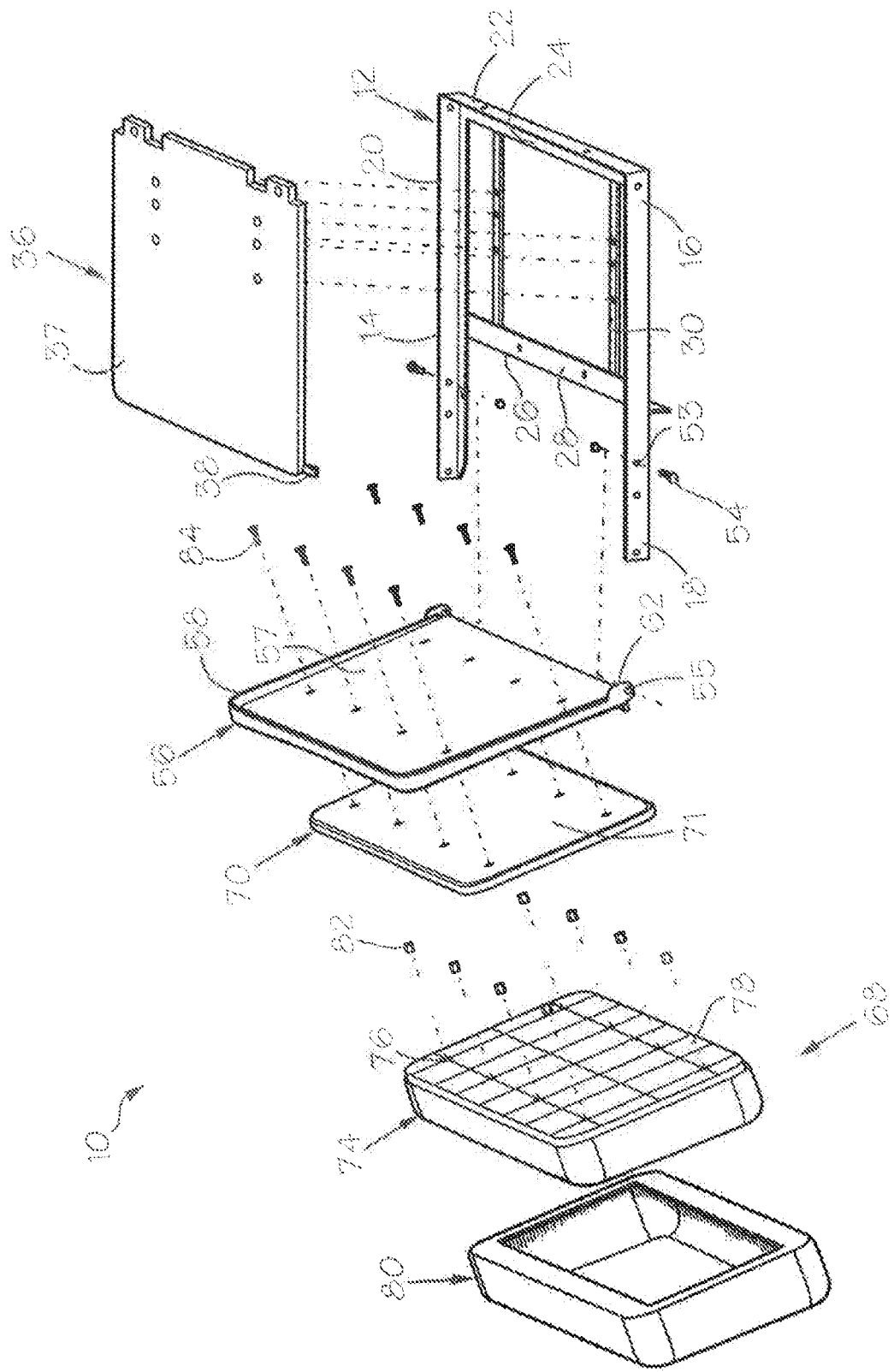
FIG. 19 is an exploded perspective view of a partial assembly of the convertible golf cart seat in accordance with the present invention.

As shown in FIGS. 19 and 20, the seat 68 comprises, from top to bottom, a vinyl cover 80, a foam seat cushion 74, and a plastic seat cushion cap 76. The plastic seat cushion cap 76 has reinforcing ribs 78 (FIG. 19) to strengthen the plastic seat cushion cap 76 and thereby provide a solid basis on which the seat cushion 74 is formed. The material for the seat cushion cap 76 is preferably 10% calcium carbonate filled polypropylene. The plastic seat cushion cap 76 further has openings to accommodate threaded inserts 82. The threaded inserts 82 are embedded in the plastic seat cushion cap 76 so that the threaded inserts 82 cannot rotate or move longitudinally with respect to the plastic seat cushion cap 76. Because the threaded inserts 82 are embedded in the plastic seat cushion cap 76, moisture cannot penetrate through the threaded inserts into the underlying foam seat cushion 74.

A plastic backer board 70 is interposed between the seat cushion cap 76 and the flip board 56 (FIGS. 19 and 20). The backer board 70 has a flat portion 71 that faces ribs 60 of the flip board 56. The opposite side of the backer board 70 has reinforcing ribs 72 that strengthen the flat portion 71. The material for the backer board 70 is preferably 10% calcium carbonate filled polypropylene. The seat 68 is constructed by first molding the foam seat cushion 74 on to the plastic seat cushion cap 76. The vinyl cover 80 is then wrapped around the seat cushion 74 and attached to the plastic seat cushion cap 76, typically by staples. The plastic backer board 70 is then positioned between the plastic seat cushion cap 76 and the flip board 56 to form a laminate comprising the vinyl covered foam cushion 74, the backer board 70, and the flip board 56. The laminate is then secured by means of machine screws 84 (FIG. 20) inserted through the flip board 56 and through the plastic backer board 70 and engaging the threaded inserts 82. Once the backer board 70 and the flip board 56 have been secured together, the combination of the reinforcing ribs 60 of the flip board 56 in contact with the flat surface 71 of the backer board 70 creates an I-beam construction between the flip board 56 and the backer board 70 thereby further reinforcing the flip board 56 and thereby the strength of the cargo bed 34. The surface construction of the flip board 56 and the backer board 70 could be reversed with ribs on the backer board 70 and a flat surface flip board 56 to create the I-beam construction. Further, the seat 68 is essentially impervious to water damage. Because the ends of the threaded inserts 82 are enclosed by the plastic seat cushion cap 76, any water that might wick along the machine screws 84 cannot penetrate the plastic seat cushion cap 76 and attack the foam seat cushion 74.

Figure 22:
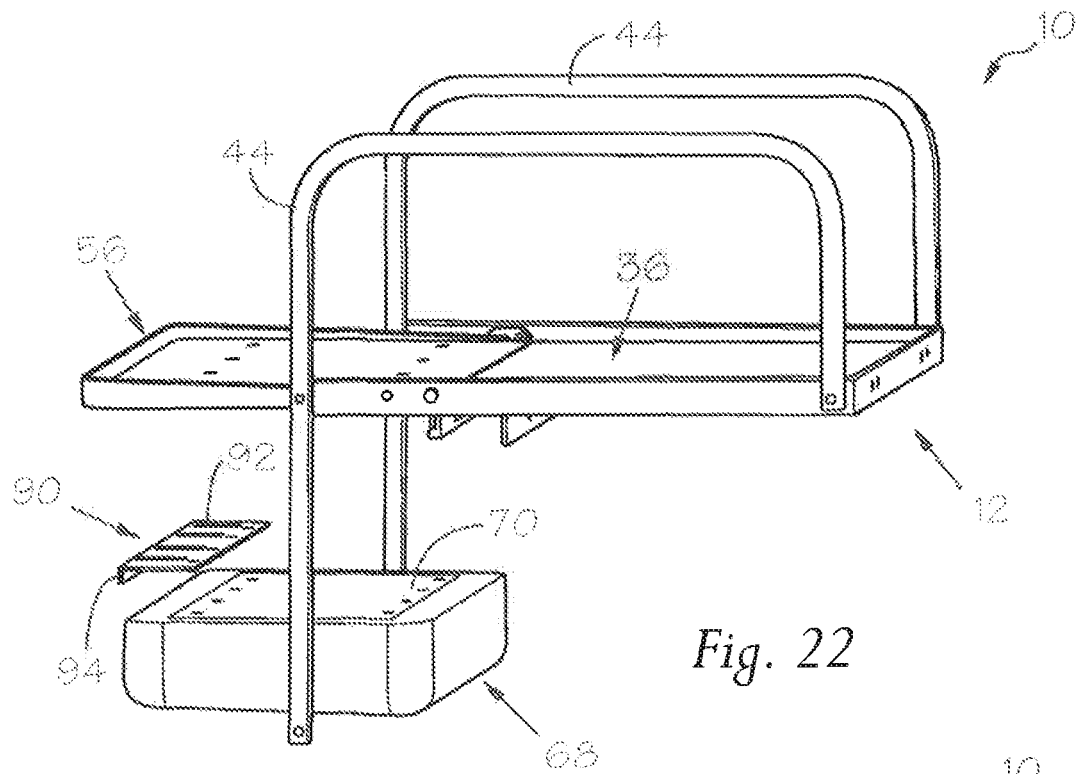
FIG. 22 is an exploded top perspective view of a second embodiment of the convertible golf cart seat in accordance with the present invention.
Figure 23:
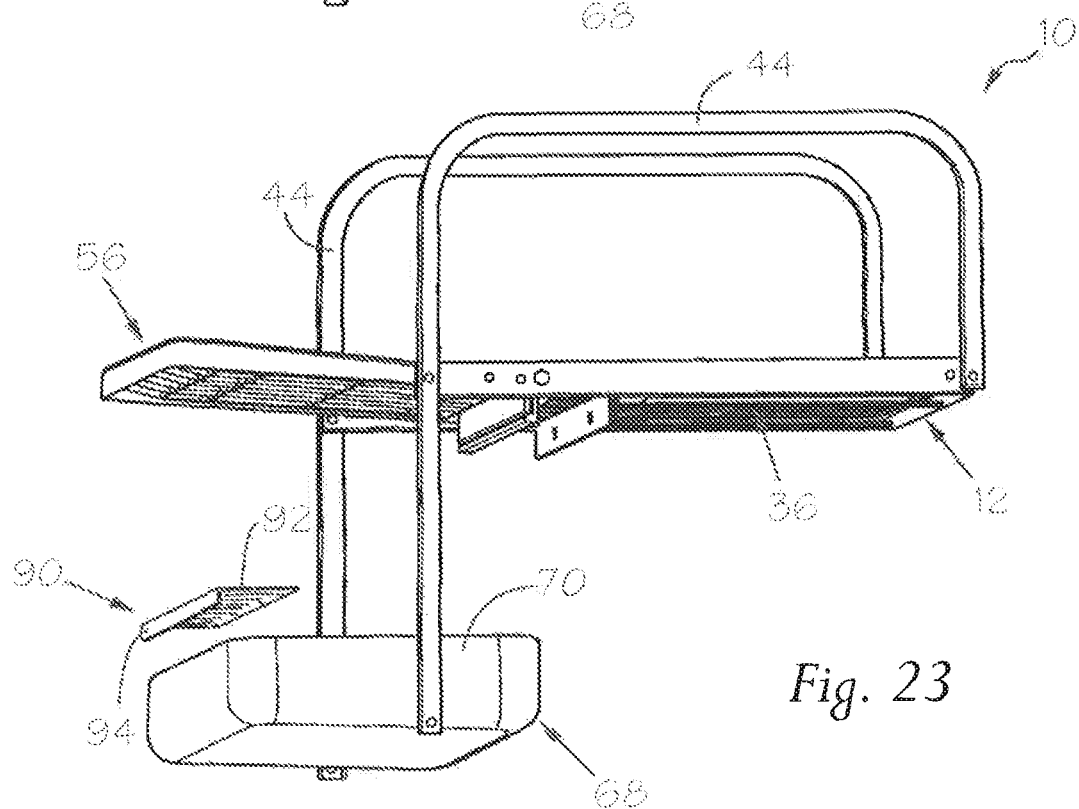
FIG. 23 is an exploded bottom perspective view of the second embodiment of the convertible golf cart seat in accordance with the present invention.

A second embodiment of the convertible golf cart seat assembly 10 is shown in FIGS. 22-24. The second embodiment of the convertible golf cart seat assembly 10 is in all major aspects as previously described except for the insertion of a stiffener plate 90 between the flip board 56 and the backer board 70. The stiffener plate 90 has a stiffener plate base 92 and a stiffener plate flange 94. The stiffener plate base 92 and the stiffener plate flange 94 are disposed at approximate a right angle to each other. When in place, the stiffener plate flange 94 overlaps the back edge of the backer board 70 and is sandwiched between the flip board 56 and the backer board 70 to provide additional stiffness to the back edge of the flip board 56. Preferably, the stiffener plate base 92 of the stiffener plate 90 extends from the back edge of the flip board 56 over a minor portion of the flip board 56 and the backer board 70 to give additional support and strength near the back edge of the flip board 56. The stiffener plate base 92 of the stiffener plate 90 could, however, the extended over a major portion of the flip board 56 and the backer board 70 to give added strength to the entire flip board 56. The stiffener plate 90 is preferably constructed of metal.

While this invention has been described with reference to preferred embodiments thereof, it is to be understood that variations and modifications can be affected within the spirit and scope of the invention as described herein and as described in the appended claims.

The invention claimed is:

1. A convertible seat assembly for attachment to a vehicle, comprising:

a main seat frame attached to the vehicle to thereby support the main seat frame on the vehicle;

a stationary cargo board positioned on the main frame such that the main frame extends around a periphery of the cargo board and supports the cargo board, the cargo board including a downwardly extending cargo board flange along a back edge of the cargo board; and a flip board including a seat mounted on a seat side and a flat flip board cargo portion defining a flip board plane on a cargo side, wherein the flip board cargo portion includes a flip board flange along a front edge of the flip board cargo portion and the flip board flange is set at an angle to the flip board plane, and wherein the flip board includes hinge brackets rotatably connecting the flip board to the main seat frame such that, in response to the flip board rotating from a seating position with the seat facing upwardly to a cargo position with the flip board cargo portion facing upwardly, the flip board flange and the cargo board flange abut each other, wherein the flip board flange and the cargo board flange have matching interlocking features that engage each other in response to the flip board being in the cargo position and the flip board flange and the cargo board flange abutting each other.

2. The convertible seat assembly of claim 1, wherein the matching interlocking features that engage each other comprise matching protrusions and apertures that engage each other in response to the flip board being in the cargo position and the flip board flange and the cargo board flange abutting each other.

3. The convertible seat assembly of claim 1, wherein the main seat frame includes a first side rail arranged along a first side of the main seat frame, a second side rail arranged along a second side of the main seat frame opposite and parallel to the first side, and a front rail arranged along a front edge of the main seat frame adjacent a front edge of the cargo board, wherein the first side rail, the second side rail, and the front rail extend upwardly away from the main seat frame, and wherein the flip board includes an integral protruding cargo rail around a periphery of the flip board on the cargo side of the flip board, the cargo rail protruding upwardly in response to the flip board being in the cargo position.

4. The convertible seat assembly of claim 1, wherein the seat comprises:
a seat cover,
a seat cushion; and
a seat cushion cap,
wherein the seat cushion cap is positioned on one side of the seat cushion and the seat cover is wrapped around the seat cushion and attached to the seat cushion cap,
wherein the seat cushion cap includes a plurality of threaded inserts embedded within the seat cushion cap and opening towards the flip board, the threaded inserts being fully enclosed by the seat cushion cap such that no portion of the threaded inserts contacts the seat cushion such that moisture cannot penetrate through the threaded inserts into the seat cushion, and
wherein the seat is connected to the flip board via screws extending through the flip board and engaging the threaded inserts to join the flip board to the seat.

5. The convertible seat assembly of claim 4, wherein a backer board is positioned between the flip board and the seat cushion cap, wherein the flip board or the backer board includes ribs that contact a flat surface of the backer board or the flip board to create an I-beam structure between the flip board and the backer board thereby strengthening the flip board, and wherein the seat cushion cap includes ribs that extend toward the backer board.

6. The convertible seat assembly of claim 5, further comprising:
a stiffener plate positioned between the flip board and the backer board, the stiffener plate including a base plate and a stiffener flange extending perpendicularly away from the base plate,
wherein the stiffener flange extends along and abuts an outer side of the seat cushion.

7. The convertible seat assembly of claim 1, wherein the cargo board flange includes a lip extending along a length of the cargo board flange, the lip extending outwardly away from the cargo board flange so as to extend under a bottom edge of the flip board flange in response to the flip board being in the cargo position.

8. The convertible seat assembly of claim 5, wherein the cargo board, the seat cushion cap, and the backer board are comprised of plastic.

9. The convertible seat assembly of claim 8, wherein the cargo board, the seat cushion cap, and the backer board are comprised of 10 percent calcium carbonate filled polypropylene.

10. A convertible seat assembly for attachment to a vehicle, comprising:
a main seat frame attached to the vehicle to thereby support the main seat frame on the armrests;
a stationary cargo board defining a cargo board plane and positioned on the main frame such that the main frame extends around a periphery of the cargo board and supports the cargo board; and
a flip board including a seat mounted on a seat side and a flat flip board cargo portion defining a flip board plane on a cargo side, wherein the flip board has hinge brackets rotatably connecting the flip board to the main seat frame such that in response to the flip board rotating from a seating position with the seat facing upwardly to a cargo position with the flip board cargo portion facing upwardly, the flip board plane is level with and parallel to the cargo board plane;
wherein the seat includes a seat cover, a seat cushion, and a seat cushion cap,
wherein the seat cushion cap includes a plurality of threaded inserts embedded within the seat cushion cap and opening towards the flip board, the threaded inserts being fully enclosed by the seat cushion cap such that no portion of the threaded inserts contacts the seat cushion such that moisture cannot penetrate through the threaded inserts into the seat cushion, and
wherein the seat is connected to the flip board via screws extending through the flip board and engaging the threaded inserts to join the flip board to the seat.

11. The convertible seat assembly of claim 10, wherein the cargo board includes a downwardly extending cargo board flange along a back edge of the cargo board and the flip board cargo portion includes a flip board flange along the front edge of the flip board cargo portion, the flip board flange being set at an angle to the flip board plane, and wherein the flip board flange and the cargo board flange have matching interlocking features that engage each other in response to the flip board being in the cargo position and the flip board flange and the cargo board flange abutting each other.

12. The convertible seat assembly of claim 11, wherein the flip board flange and the cargo board flange have matching protrusions and apertures that engage each other in response to the flip board being in the cargo position and the flip board flange and the cargo board flange abutting each other.

13. The convertible seat assembly of claim 10, wherein the main seat frame includes a first side rail arranged along a first side of the main seat frame, a second side rail arranged along a second side of the main seat frame opposite and parallel to the first side, and a front rail arranged along a front edge of the main seat frame adjacent a front edge of the cargo board, wherein the first side rail, the second side rail, and the front rail extend upwardly away from the main seat frame, and wherein the flip board includes an integral protruding cargo rail around a periphery of the flip board on the cargo side of the flip board, the cargo rail protruding upwardly in response to the flip board being in the cargo position.

14. The convertible seat assembly of claim 10, wherein the seat cushion cap is positioned on one side of the seat cushion and the seat cover is wrapped around the seat cushion and attached to the seat cushion cap.

15. The convertible seat assembly of claim 10, wherein a backer board is positioned between the flip board and the seat cushion cap, wherein the flip board or the backer board includes ribs that contact a flat surface of the backer board or the flip board to create an I-beam structure between the flip board and the backer board thereby strengthening the flip board, and wherein the seat cushion cap includes ribs that extend toward the backer board.

16. The convertible seat assembly of claim 15, further comprising:
   a stiffener plate positioned between the flip board and the backer board, the stiffener plate including a base plate and a stiffener flange extending perpendicularly away from the base plate,
   wherein the stiffener flange extends along and abuts an outer side of the seat cushion.

17. The convertible seat assembly of claim 10, wherein the cargo board flange includes a lip extending along a length of the cargo board flange, the lip extending outwardly away from the cargo board flange so as to extend under a bottom edge of the flip board flange in response to the flip board being in the cargo position.

18. The convertible seat assembly of claim 15, wherein the cargo board, the seat cushion cap, and the backer board are comprised of plastic.

19. The convertible seat assembly of claim 18, wherein the cargo board, the seat cushion cap, and the backer board are comprised of 10 percent calcium carbonate filled polypropylene.

20. A method of attaching a convertible seat assembly on a vehicle, comprising:
   attaching a main seat frame to the vehicle to thereby support the main seat frame on the vehicle;
   positioning a stationary cargo board on the main frame such that the main frame extends around a periphery of the cargo board and supports the cargo board, the cargo board including a downwardly extending cargo board flange along a back edge of the cargo board; and
   rotatably connecting a flip board to the main seat frame via hinge brackets, the flip board including a seat mounted on a seat side and a flat flip board cargo portion defining a flip board plane on a cargo side, wherein the flip board cargo portion includes a flip board flange along a front edge of the flip board cargo portion and the flip board flange is set at an angle to the flip board plane, and wherein, in response to the flip board rotating from a seating position with the seat facing upwardly to a cargo position with the flip board cargo portion facing upwardly, the flip board flange and the cargo board flange abut each other,
   wherein the flip board flange and the cargo board flange have matching interlocking features that engage each other in response to the flip board being in the cargo position and the flip board flange and the cargo board flange abutting each other.

* * * * *